(12) United States Patent
Gotou et al.

(10) Patent No.: US 8,848,136 B2
(45) Date of Patent: Sep. 30, 2014

(54) DISPLAY DEVICE HAVING ENLARGED VIEWING ANGLE

(75) Inventors: Masahiro Gotou, Tokyo (JP); Hiroshi Sekiguchi, Tokyo (JP); Hiroshi Yamamoto, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 157 days.

(21) Appl. No.: 13/581,692

(22) PCT Filed: May 13, 2011

(86) PCT No.: PCT/JP2011/061088
§ 371 (c)(1),
(2), (4) Date: Aug. 29, 2012

(87) PCT Pub. No.: WO2012/008212
PCT Pub. Date: Jan. 19, 2012

(65) Prior Publication Data
US 2012/0320311 A1 Dec. 20, 2012

(30) Foreign Application Priority Data
Jul. 12, 2010 (JP) .................. 2010-158123

(51) Int. Cl.
G02F 1/1335 (2006.01)
G09F 13/04 (2006.01)
G02B 5/02 (2006.01)
F21V 8/00 (2006.01)

(52) U.S. Cl.
CPC ............ *G02B 5/0242* (2013.01); *G02B 5/0231* (2013.01); *G02B 6/0041* (2013.01); *G02B 6/0053* (2013.01); *G02B 6/0038* (2013.01); *G02F 1/133524* (2013.01)
USPC ............... 349/65; 349/64; 362/97.2

(58) Field of Classification Search
CPC ............... G02F 1/133615; G02F 1/133604; G02F 1/133605; G02F 1/133606; G02F 1/133608; G02F 2001/133607; G02B 6/0038
USPC ...................... 349/65, 64; 362/97.2
See application file for complete search history.

(56) References Cited

U.S. PATENT DOCUMENTS 7,217,023 B2 * 5/2007 Iwasa et al. .................. 362/555
(Continued)

FOREIGN PATENT DOCUMENTS

| JP | 07-104271 A | 4/1995 |
| JP | 09-160024 A | 6/1997 |
| JP | 09-288274 A | 11/1997 |
| JP | 09288274 A * | 11/1997 ............ G02F 1/1335 |

(Continued)

OTHER PUBLICATIONS

International Search Report; mailed Jun. 21, 2011; PCT/JP2011/061088.

*Primary Examiner* — Mike Qi
(74) *Attorney, Agent, or Firm* — Ladas & Parry LLP

(57) ABSTRACT

The present invention provides a display device which can ensure a large viewing angle while maintaining high light source energy use efficiency. The display device 10, which outputs light emitted from a light source 25 to an observer side in a form of an image, comprises: a light guide plate 21 which has a light output face, a back face, and a side face positioned between the light output face and the back face; a light source 25 which emits light to the side face of the light guide plate; an optical sheet 30 disposed on the observer side of the light guide plate; a liquid crystal panel 15 disposed on the observer side of the optical sheet; and a device 40 for enlarging a view disposed on the observer side of the liquid crystal panel.

6 Claims, 10 Drawing Sheets

(56) References Cited

U.S. PATENT DOCUMENTS

| | | | |
|---|---|---|---|
| 8,139,179 B2* | 3/2012 | Daiku | 349/63 |
| 2007/0014110 A1* | 1/2007 | Itaya | 362/231 |
| 2010/0253880 A1* | 10/2010 | Sasaki et al. | 349/64 |

FOREIGN PATENT DOCUMENTS

| | | |
|---|---|---|
| JP | 11-142846 A | 5/1999 |
| JP | 2004-226503 A | 8/2004 |
| JP | 2007-24915 A | 2/2007 |

\* cited by examiner

DISPLAY DEVICE HAVING ENLARGED VIEWING ANGLE

TECHNICAL FIELD

The present invention relates to a display device which outputs an image to an observer side and relates to a display device which has excellent optical characteristics.

BACKGROUND ART

Liquid crystal display devices such as a liquid crystal television are provided with a surface light source device which illuminates a liquid crystal panel from the back side (for example, Patent Document 1). The surface light source device is categorized into two major types: a direct type, in which a light source is disposed in a manner facing an optical member; and an edge light type, in which a light source is disposed on the side of an optical member. The edge-light type surface light source device has an advantage that it can be made thinner, compared with the direct-type surface light source device.

The edge-light type surface light source device is provided with a light guide plate, which faces a liquid crystal panel and guides the source light emitted from the side. The light from the light source enters the light guide plate from the side face (light input face) of the light guide plate. The light that has entered the light guide plate is reflected repeatedly in the light guide plate, and moves through the light guide plate toward the face opposing to the light input face (in a light guiding direction). As the light moves through the light guide plate, it is gradually emitted from the light output face by the optical function of the light guide plate. Accordingly, the amount of light emitted from the light output face of the light guide plate is uniformed along the light guiding direction.

CITATION LIST

Patent Literatures

Patent Document 1: Japanese Patent Application Laid-Open No. 2004-226503

SUMMARY OF THE INVENTION

Problems to be Solved by the Invention

The important indicators for evaluating performance of a display device are the level of light source energy use efficiency and the size of the viewing angle. The liquid crystal panel by its nature exhibits excellent contrast and efficiency for perpendicularly incident light; however, as to obliquely incident light or oblique observation, the contrast and efficiency degrade significantly. Therefore, in attempting to improve the use efficiency, it is necessary to concentrate the light incident upon the liquid crystal panel in the front direction. On the other hand, such concentration of light causes a problem in attempting to enlarge a viewing angle.

In particular, the TN mode liquid crystal has an advantage that it has a simple structure and is efficient, but the problem is that it has a narrow viewing angle. Other types of liquid crystal also have a similar problem though differing in degree.

In view of the above problems, an object of the present invention is to provide a display device which can ensure a large viewing angle while maintaining high light source energy use efficiency.

Means for Solving the Problem

Hereinafter, the present invention will be described. In order to make the present invention easier to understand, reference numerals of the accompanying drawings are written in parentheses; however, the present invention is not limited to the embodiments shown in the drawings.

A first aspect of the present invention is a display device (10) which outputs light emitted from a light source (25) to an observer side in a form of an image, the display device comprising: a light guide plate (21) having a light transmitting property, which has a light output face directed toward the observer side, a back face opposing to the light output face, and a side face positioned between the light output face and the back face; a light source disposed on the side face of the light guide plate so as to be capable of emitting light thereto; an optical sheet (30) disposed on the observer side of the light guide plate; a liquid crystal panel (15) disposed on the observer side of the optical sheet; and a device (40) for enlarging a view disposed on the observer side of the liquid crystal panel, wherein a plurality of protruding unit optical elements (23a) are arranged in a row on the light output face side of the light guide plate, along the sheet face; the unit optical elements extend from the side face where the light source is disposed to the side face opposing thereto with a predetermined cross section, and are arranged in a row in a direction orthogonal to the extending direction thereof; a plurality of protruding unit prisms (32a) are arranged in a row on the light guide plate side face of the optical sheet, along the sheet face; the unit prisms extend in the arrangement direction of the unit optical elements, with a predetermined cross section, and are arranged in a row in a direction orthogonal to the extending direction of the unit prisms.

A second aspect of the present invention is the display device (10) according to the first aspect, wherein the device for enlarging a view is a view enlarging member (40) which is disposed on the observer side of the liquid crystal panel; and the view enlarging member comprises a light enlarging portion (42) provided with: a plurality of transmissive portions (43) having a substantially trapezoidal cross section with a shorter upper base on the observer side and a longer lower base on the liquid crystal panel (15) side, having a light transmitting property, and arranged in a row along the sheet face; and in-between portions (44) formed between the adjacent light-transmissive portions and having a refractive index smaller than that of the transmissive portion; and the transmissive portions extend in one direction while maintaining the substantially trapezoidal cross section.

A third aspect of the present invention is the display device (10) according to the first aspect, wherein the device for enlarging a view is a view enlarging member (40) which is disposed on the observer side of the liquid crystal panel; and the view enlarging member comprises a light enlarging portion (42) provided with: a plurality of transmissive portions (43) having a substantially trapezoidal cross section with a shorter upper base on the observer side and a longer lower base on the liquid crystal panel (15) side, having a light transmitting property, and arranged in a row along the sheet face; and in-between portions (44) formed between the adjacent light-transmissive portions and having a refractive index smaller than that of the transmissive portion; and the transmissive portions extend in the extending direction of the unit optical elements (23a) or in the extending direction of the unit prisms (32a), while maintaining the substantially trapezoidal cross section.

A fourth aspect of the present invention is the display device (10) according to the second aspect, wherein the in-between portion (44) of the view enlarging member (40) is configured to be capable of absorbing light.

A fifth aspect of the present invention is the display device (10) according to the second aspect, wherein the transmissive portion (43) of the view enlarging member (40) extends in a perpendicular direction.

A sixth aspect of the present invention is the display device (10) according to the first aspect, wherein a light scattering agent (22b) is dispersed in the light guide plate (21).

A seventh aspect of the present invention is the display device (10) according to the first aspect, wherein the liquid crystal panel (15) is a TN mode one.

Effects of the Invention

With the display device of the present invention, it is possible to ensure a large viewing angle while maintaining high energy use efficiency.

MODES FOR CARRYING OUT THE INVENTION

Figure 1:
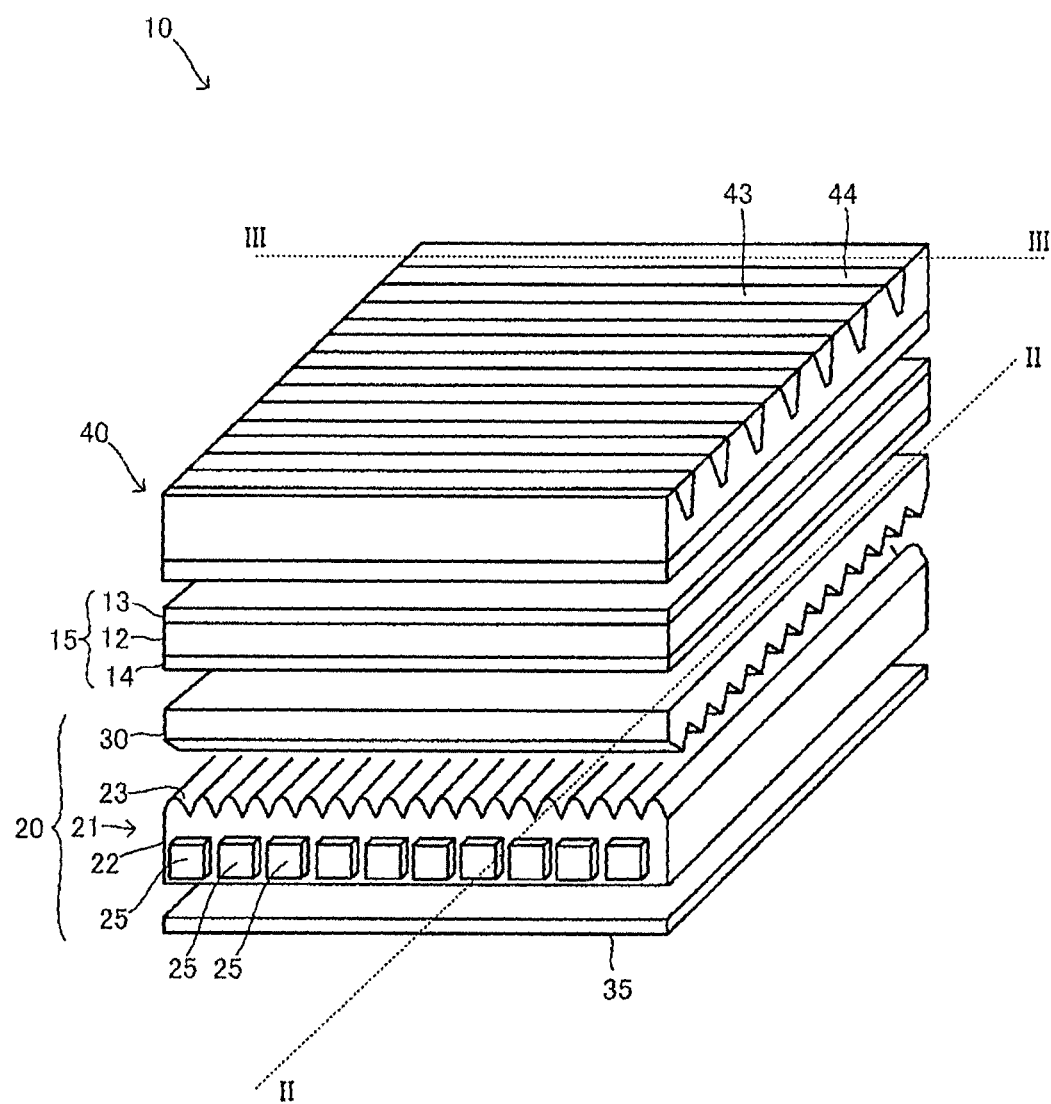
FIG. 1 is an exploded perspective view illustrating a display device according to one embodiment.

The above functions and benefits of the present invention will be apparent from the following modes for carrying out the invention. Hereinafter, the present invention will be described based on the embodiments shown in the drawings. However, the invention is not limited to these embodiments.

FIG. 1 is an exploded perspective view focusing on a liquid crystal panel 15, a surface light source device 20, and a view enlarging member 40 of a display device 10 according to one embodiment. The display device 10 will be described with reference to FIG. 1 and other drawings as necessary.

The display device 10 comprises a liquid crystal panel 15, a surface light source device 20, and a view enlarging member 40. The display device 10 is further equipped with ordinary devices not shown that are necessary for the display device 10 to operate as a display device. In FIG. 1, the upper side of the drawing sheet is the observer side.

The liquid crystal panel 15 comprises: an upper polarizing plate 13 disposed on the view enlarging member 40 side; a lower polarizing plate 14 disposed on the surface light source device 20 side; and a liquid crystal cell 12 disposed between the upper polarizing plate 13 and the lower polarizing plate 14. The polarizing plates 13 and 14 have a function to: divide incident light into two polarization components (P wave and S wave) that are orthogonal to each other; transmit the polarization component (for example, P wave) of one direction (a direction parallel to a transmission axis); and absorb the polarization component (for example, S wave) of the other direction (a direction parallel to an absorption axis) which is orthogonal to the above direction.

In the liquid crystal cell 12, an electric field may be applied on a region to region basis, each region forming one pixel. The alignment of the liquid crystal cell 12 in which the electric field is applied varies. The polarization component (for example, P wave in the present embodiment) of a particular direction that is transmitted through the lower polarizing plate 14 disposed on the surface light source device 20 side (i.e. the light input side), rotates the polarization direction thereof by 90° when passing through the liquid crystal cell 12 in which the electric field is applied, whereas maintaining the polarization direction thereof when passing through the liquid crystal cell 12 in which the electric field is not applied. As such, based on whether the electric field is applied in the liquid crystal cell 12 or not, it is possible to control whether the polarization component (P wave) of the particular direction transmitted through the lower polarizing plate 14 is further transmitted through the upper polarizing plate 13 disposed on the light output side of the lower polarizing plate 14, or is absorbed and blocked by the upper polarizing plate 13.

In this way, the liquid crystal panel 15 is configured to be capable of controlling, on a pixel to pixel basis, transmission or blocking of the light emitted from the surface light source device 20 to display an image.

Based on this principle, the liquid crystal panel is capable of providing an image to an observer. The liquid crystal panel produces by its nature excellent contrast of the emitted light and excellent efficiency (transmissivity) with regard to the light incident in a direction normal to the liquid crystal panel. However, the problems of degradation of the contrast and efficiency (transmissivity) occur with regard to the light incident obliquely against the direction normal to the liquid crystal panel, and also in a case of an oblique observation by an observer. Namely, enlargement of a viewing angle and energy use efficiency conflict with each other. Especially, although the TN mode liquid crystal has an advantage that it has a relatively simple structure and is inexpensive, it has a narrow viewing angle. In this point, the display device 10 of the present embodiment can enlarge a viewing angle while maintaining high energy use efficiency, even when the liquid crystal panel is a TN mode one. It should be noted that the liquid crystal panel to be employed is not limited to the TN mode one, and that the possibility of employing other types of liquid crystal panels (such as STN, VA, MVA, IPS, OCB) is not excluded. With other types of liquid crystal panels such as these as well, the display device 10 can exert such advantageous effects.

Figure 2:
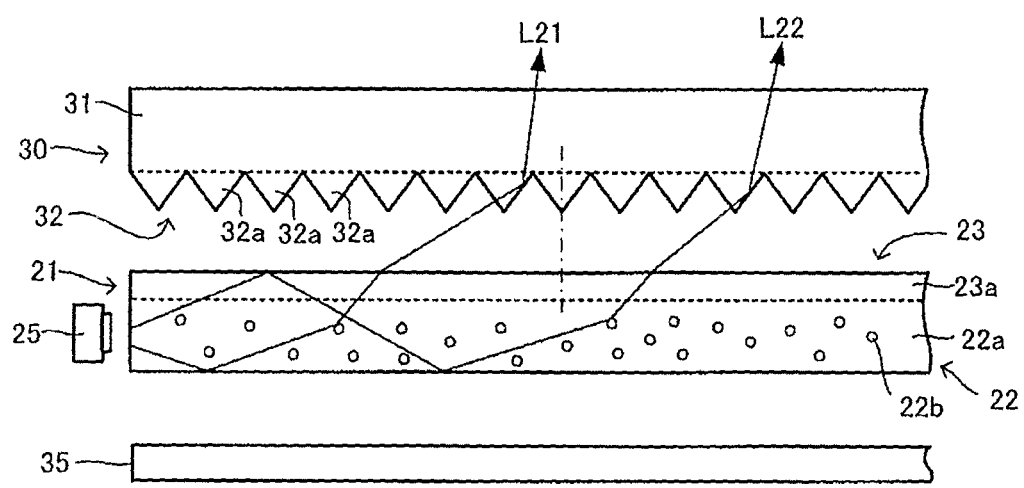
FIG. 2 is an exploded view of one cross section (a cross section along II-II in FIG. 1) of a surface light source device.
Figure 3:
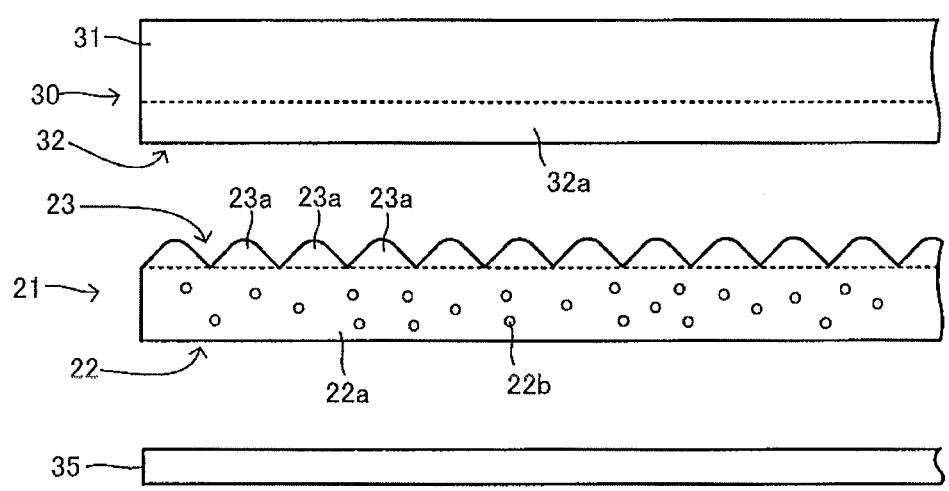
FIG. 3 is an exploded view of another cross section (a cross section along in FIG. 1) of the surface light source device.

Next, The surface light source device 20 will be described. FIG. 2 shows a cross section in a thickness direction of the surface light source device 20 (the top and bottom direction on the drawing sheet of FIG. 1) along II-II in FIG. 1. FIG. 3 shows a cross section in the thickness direction of the surface light source device 20 (a top and bottom direction on the drawing sheet of FIG. 1) along in FIG. 1.

The surface light source device 20 is a lighting device disposed on a side of one face of the liquid crystal panel 15, the face being opposite from the observer side face, and emits planar light to the liquid crystal panel 15. As can be seen from FIGS. 1 to 3, the surface light source device 20 is configured to be an edge-light type surface light source device, and comprises a light guide plate 21, a light source 25, an optical sheet 30, and a reflection sheet 35.

The light guide plate 21 comprises a base portion 22 and a unit optical element portion 23, as can be seen from FIGS. 1 to 3. The base portion 22 is a flat member, and is configured such that a light scattering agent (light diffusing particles) 22b is dispersed in a main portion 22a that has a light transmitting property. The light scattering agent 22b causes the light moving through the main portion 22a to change its moving direction by reflection, refraction, or the like. Such a light diffusing function (light scattering function) of the light scattering agent 22b can be fulfilled for example by constituting a material for forming the main portion 22a by a material having a refractive index different from that of the light scattering agent 22b. In addition, the light scattering agent 22b may be a material that can exert a reflection effect on the light.

The unit optical element portion 23, as can be seen from FIGS. 1 to 3, is a portion formed on a face of the base portion 22 which face is on the optical sheet 30 side; and has a plurality of unit optical elements 23a arranged in a row. The unit optical elements 23a are pillared elements that extend in the front and back direction of the drawing sheet of FIG. 3 while maintaining the cross section shown in FIG. 3. The extending direction thereof is orthogonal to the direction in which they are aligned.

Figure 4:
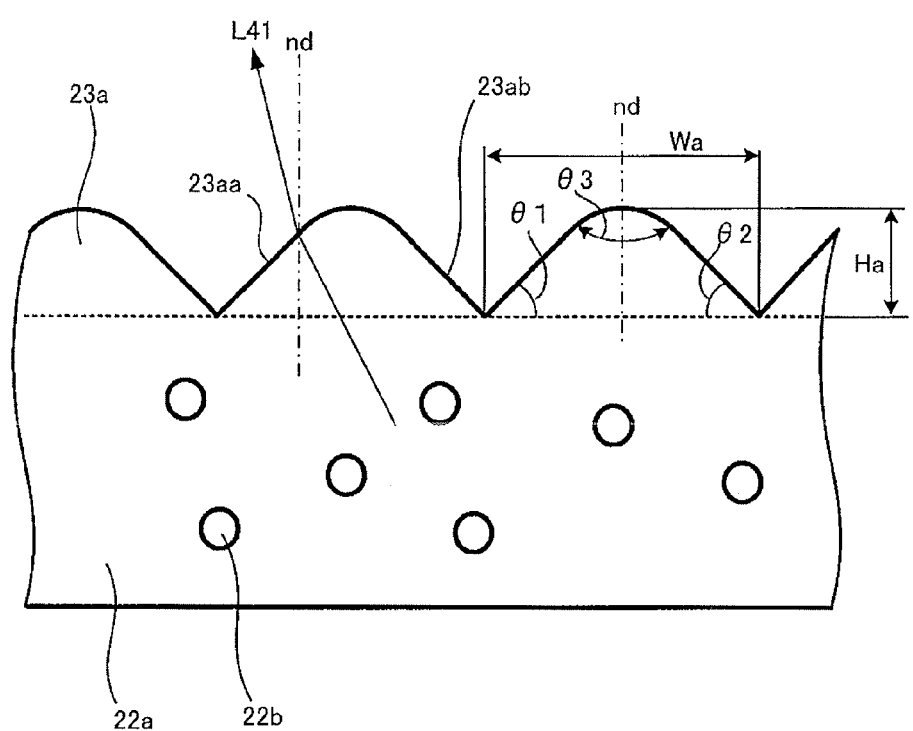
FIG. 4 is a partially enlarged view of FIG. 3.

FIG. 4 is an enlarged view focusing on the unit optical element 23a part of FIG. 3. As can be seen from FIG. 4, the unit optical element 23a is a protrusion-shaped triangle having a base on one face of the base portion 22 and protruding from the base portion 22. In the unit optical element 23a of the present embodiment, a vertex facing the base in the cross section is in a curved shape.

Further, the cross-sectional shape of the unit optical element 23a preferably satisfies at least one of the below condition A and condition B.

Condition A: the angles other than the vertex angle of the triangular-shaped cross section, that is, angles θ1 and θ2 of the base angles of the triangular-shaped cross section that are positioned on the base portion 22 are 25° or more and 45° or less.

Condition B: the ratio (Ha/Wa) of the height Ha of the unit optical element 23a to the length Wa of the base of the unit optical element 23a is 0.2 or more and 0.5 or less.

When at least one of the above conditions A and B is satisfied, the light condensing effect is highly effectively exerted on the light component of the light emitted from the light guide plate 21, the light component being the component along the direction (left and right direction of the drawing sheet of FIG. 4) in which the unit optical elements 23a are arranged.

Further, in the present embodiment, the unit optical element 23a is isosceles triangular in the cross section shown in FIGS. 3 and 4 (the cross section along the arrangement direction of the unit optical elements 23a). With this configuration, it is possible to effectively increase brightness on the front side, and to give symmetry to an angle distribution of the brightness in the plane along the arrangement direction of the unit optical elements 23a. Therefore, the two base angles θ1 and θ2 in the triangular-shaped cross section are preferably equal.

Here, the "triangular shape" mentioned in the description of the present application does not only refer to a triangular shape in a strict sense, but also includes a substantially triangular shape encompassing limitations in the manufacturing techniques, errors occurring at the time of forming a shape, and other factors. Likewise, other terms used in the description of the present application which specify a shape or geometric conditions, for example the terms such as "parallel" "orthogonal", "oval" and "circle" are not limited strictly, but are interpreted encompassing the errors that still enable similar optical functions to be attained.

The dimension of the light guide plate 21 having the above described configuration may be set as follows, as one example. Firstly, to give a specific example of the unit optical element 23a, the width Wa (see FIG. 4) thereof along the plate face of the light guide plate 21 may be 20 μm or more and 500 μm or less; and the height Ha (see FIG. 4) of the unit optical element 23a along the direction nd normal to the plate face of the light guide plate 21 may be 4 μm or more and 250 μm or less. Further, when the cross section of the unit optical element 23a is formed in a triangular shape, the vertex angle θ3 (see FIG. 4) may be 90° or more and 125° or less.

On the other hand, the thickness of the base portion 22 may be 0.5 mm to 6 mm.

The light guide plate 21 having the above described configuration can be produced by extrusion molding or by forming the unit optical element 23a on the base material. As for the material to constitute the main portion 22a in the base portion 22 and the unit optical element 23a of the light guide plate 21, various kinds of materials may be employed. However, a material widely used for the optical sheet incorporated into the display device, having excellent mechanical properties, optical properties, stability, workability, and the like, and being available at low cost may be favorably used, for example transparent resins comprising as a main component, one or more of acrylic, styrene, polycarbonate, polyethylene terephthalate, acrylonitrile etc.; and epoxy acrylate-based or urethane acrylate-based reactive resins (ionizing radiation curable resins and the like). On the other hand, an example of the light scattering agent 22b to be used may be particles of a transparent material such as silica (silicon dioxide), alumina (aluminum oxide), acrylic resins, polycarbonate resins, and silicone resins, having an average particle size of about 0.5 μm to 100 μm.

In the light guide plate 21 produced by extrusion molding, the base portion 22 and the unit optical element portion 23 may be formed integrally with each other. In addition, in a case of producing the light guide plate 21 by forming the unit optical element 23a on the base material, the unit optical element portion 23 may be constituted by the same resin material as the material to constitute the main portion 22a in the base portion 22; or it may be constituted by a different material.

Back to FIGS. 1 to 3, the light source 25 will be described. Of two sets of opposing flat side faces of the base portion 22 of the light guide plate 21, the light source 25 is disposed on one set of opposing side faces, both side faces, which are both ends in the longitudinal direction along which the unit optical elements 23a extend. The kinds of the light source are not particularly restricted; however, the light source can be configured in various forms, and for example a fluorescent lamp such as a linear cold cathode tube, a point-like LED (light emitting diode), or an incandescent light bulb can be used. In the present embodiment, the light source 25 is formed by a plurality of LEDs, and is configured such that the output of each LED, that is, turning-on/off of each LED, and/or the brightness of each LED when turned on can be adjusted by a control device not shown, independently from the output of the other LEDs.

Next, the optical sheet 30 will be described. As can be seen from FIGS. 1 to 3, the optical sheet 30 comprises: a sheet shaped body portion 31; and a unit prism portion 32 arranged on a face of the body portion 31 which faces the light guide plate 21, that is, on the light input side face.

As described below, this optical sheet 30 has a function (a light condensing function) of changing the moving direction of the light incident from the light input side to emit the light from the light output side, and intensively increasing the brightness in the front direction (normal direction). This light condensing function is mainly fulfilled by the unit prism portion 32 of the optical sheet 30.

As shown in FIGS. 1 to 3, the body portion 31 is a flat sheet-like member which functions to support the unit prism portion 32. Of the faces of the body portion 31, the face which is opposite to the side facing the light guide plate 21 is the light output side face. In the present embodiment, the light output side face of the body portion 31 is configured to be flat and smooth. However, the face on the light output side is not limited to being smooth; it may be a face with micro asperities (a so-called mat face), and various surface conditions can be adopted as necessary.

As well shown in FIGS. 1 to 3, the unit prism portion 32 is disposed such that a plurality of unit prisms 32a are arranged in a row along the light input side face of the body portion 31. More specifically, the unit prisms 32a are pillared members formed in a manner extending in a direction orthogonal to the arrangement direction thereof, while maintaining the predetermined cross-sectional shape shown in FIG. 2. The extending direction of the unit prisms 32a is not only a direction orthogonal to the arrangement direction thereof, but also a direction deviated by 90° from the extending direction of the unit optical elements 23a of the light guide plate 21. As such, the extending direction of the unit prisms 32a and the extending direction of the unit optical elements 23a are orthogonal to each other, when the display device is seen from the front side.

Further, the longitudinal direction of the unit prism 32a crosses the transmission axis of the lower polarizing plate 14 of the liquid crystal panel 15, when it is observed from the front side. The longitudinal direction of the unit prism 32a of the optical sheet 30 preferably crosses the transmission axis of the lower polarizing plate 14 of the liquid crystal panel 15 at an angle larger than 45° and smaller than 135° on the face parallel to the display face of the display device (the face parallel to the sheet face of the body portion 31 of the optical sheet 30). The angle mentioned herein means a smaller angle of the angles made by the longitudinal direction of the unit prism 32a and the transmission axis of the lower polarizing plate 14, that is, an angle of 180° or less. Particularly in the present embodiment, the longitudinal direction of the unit prism 32a of the optical sheet 30 is preferably orthogonal to the transmission axis of the lower polarizing plate 14 of the liquid crystal panel 15; and the arrangement direction of the unit prisms 32a of the optical sheet 30 is preferably parallel to the transmission axis of the lower polarizing plate 14 of the liquid crystal panel 15.

Figure 5:
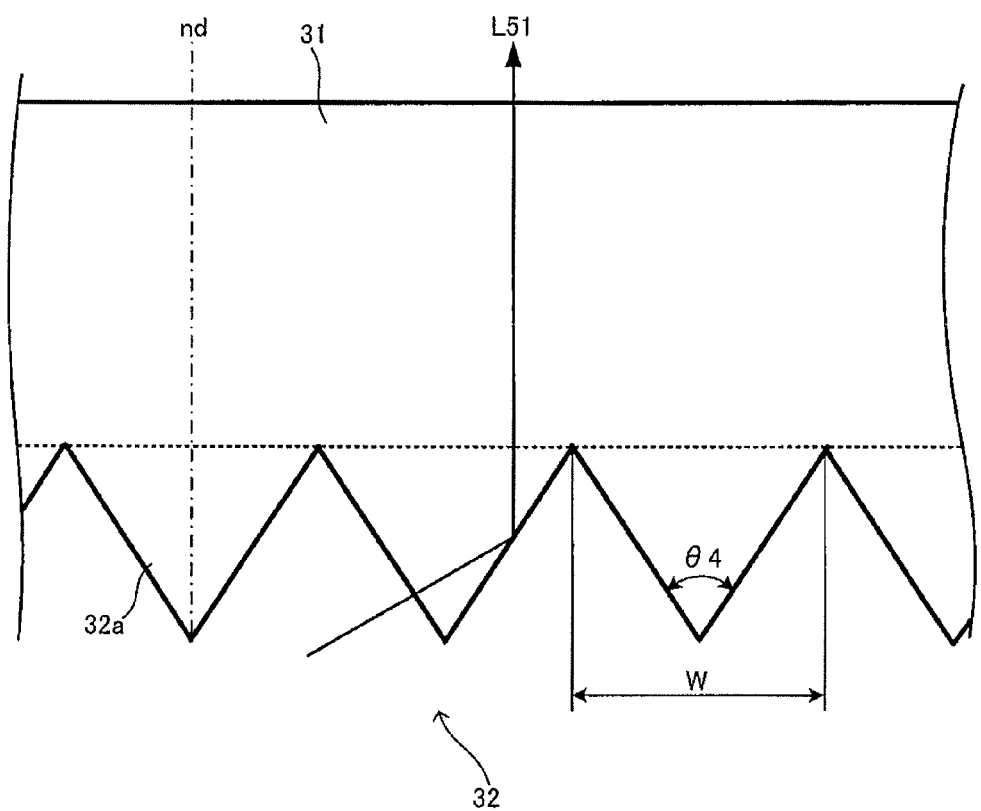
FIG. 5 is a partially enlarged view of FIG. 2.

Next, the cross-sectional shape of the unit prism 32a in the arrangement direction thereof will be described. FIG. 5 is a partially enlarged view of the optical sheet 30 shown in FIG. 2. Herein, "nd" shows the direction normal to the sheet face of the body portion 31.

As can be seen from FIG. 5, in the present embodiment, the unit prism 32a has an isosceles triangular cross section, in which the face of the body portion 31 on the light guide plate 21 side protrudes. In specific, the width of the unit prism 32a in a direction parallel to the sheet face of the body portion 31 becomes smaller as it gets farther from the body portion 31 along the direction "nd" normal to the body portion 31.

Further, in the present invention, the outer contour of the unit prism 32a forms a line symmetry with an axis parallel to the direction "nd" normal to the body portion 31 as an symmetrical axis; and the cross section of the unit prism 32a is an isosceles triangle. With this configuration, the brightness on the light output face of the optical sheet 30 can have a symmetrical angle distribution of brightness around the front direction, in the plane parallel to the arrangement direction of the unit prisms 32a.

Herein, the dimension of the unit prism 32a is not particularly restricted; however, a proper light condensing property can often be attained by setting the vertex angle θ4 (see FIGS. 5) at 60° to 70° and the width W of the base at approximately 50 μm.

The optical sheet 30 having the above described configuration can be produced by extrusion molding or by forming the unit prism 32a on the body portion 31. As for the material to constitute the optical sheet 30, various kinds of materials may be used. However, a material widely used for the optical sheet incorporated into the display device, having excellent mechanical properties, optical properties, stability, workability, and the like, and being available at low cost may be favorably employed, for example transparent resins comprising as a main component, one or more of acrylic, styrene, polycarbonate, polyethylene terephthalate, acrylonitrile etc.; or epoxy acrylate-based or urethane acrylate-based reactive resins (ionizing radiation curable resins and the like).

In the present embodiment, the unit lens having the triangular-shaped cross section as above has been described; however, the cross-sectional shape is not limited thereto. It may be a trapezoidal shape, changing the vertex part of the triangle into a shorter upper base. Further, the oblique line of the triangle may be a polygonal line or curved line.

Back to FIGS. 1 to 3, the reflection sheet 35 of the surface light source device 20 will be described. The reflection sheet 35 is a member for reflecting the light emitted from the back face of the light guide plate 21 to make the light enter the light guide plate 21 again. As for the reflection sheet 35, a sheet that enables so-called specular reflection may be preferably employed, for example a sheet made of a material having high reflectance such as metal, or a sheet that includes as a surface layer, a thin film (for example, thin metal film) made of a material having high reflectance. With this configuration, the light convergence property can be improved and energy use efficient can be enhanced.

Figure 6:
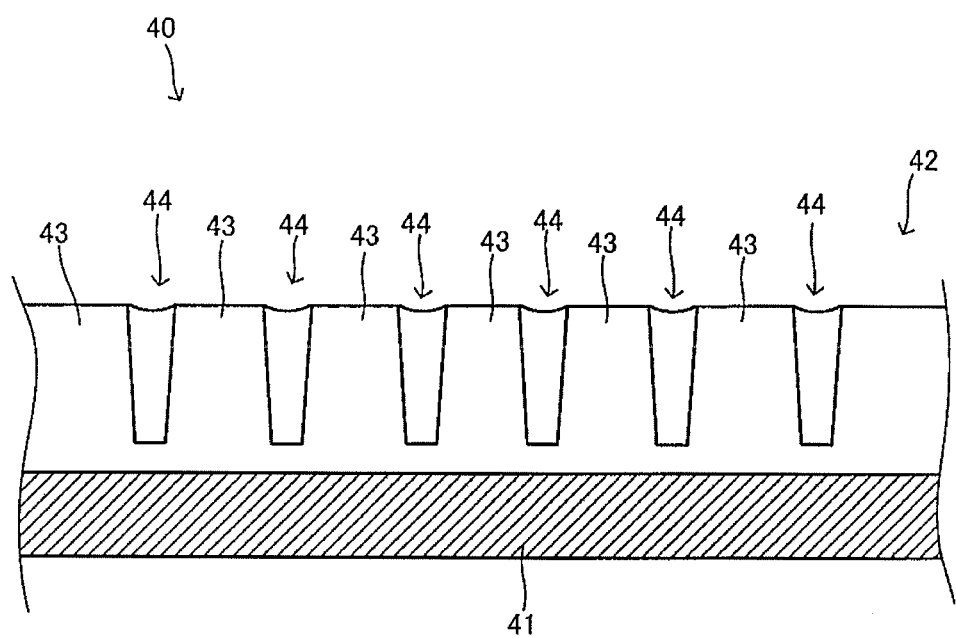
FIG. 6 is a view of a cross section (a cross section along II-II in FIG. 1) of a view enlarging member.

Back to FIG. 1, the view enlarging member 40 will be described next. The view enlarging member 40 is a member which functions as a device for enlarging a view to enlarge a viewing angle of the light from the surface light source device 20 that has transmitted through the liquid crystal panel 15 and has obtained image information. This enables an image with a wide viewing angle to be provided to the observer. FIG. 6 focuses on the view enlarging member 40 provided to the display device 10 of the present embodiment, showing a part of the cross section thereof along II-II in FIG. 1, and schematically showing the layer structure thereof.

The view enlarging member 40 comprises a base material layer 41, and an enlarging layer 42 formed on the base material layer 41. The base material layer 41 and the enlarging layer 42 will be described below.

The base material layer 41 is a layer to serve as a base material for forming the enlarging layer 42 thereon. The base material layer 41 is preferably constituted by a material having polyethylene terephthalate (PET) as a main component. When the base material 41 is mainly composed of PET, it may also contain other resins. In addition, various kinds of additives may also be added thereto as necessary. General examples of additives include: phenol-based or other types of antioxidants; and lactone-based or other types of stabilizers. Herein, the term "main component" means that the above mentioned PET is contained in an amount of 50 mass % or more, based on the entire material forming the base material layer (hereinafter, the same shall apply).

Note that the main component of the material to constitute the base material layer 41 does not necessarily have to be PET, but may be other materials. Examples thereof include: polyester-based resins such as polybutylene terephthalate, polyethylene naphthalate, terephthalic acid-isophthalic acid-ethylene glycol copolymer, terephthalic acid-cyclohexane dimethanol-ethylene glycol copolymer; polyamide-based resins such as nylon 6; polyolefin-based resins such as polypropylene and polymethyl pentene; acrylic resins such as polymethyl methacrylate; styrene-based resins such as polystyrene and styrene-acrylonitrile copolymer; cellulose-based resins such as triacetyl cellulose; imide-based resins; and polycarbonate resins. Additives such as an ultraviolet absorber, filler, plasticizer, and antistatic agent may be adequately added to these resins as necessary.

In the present embodiment, from a viewpoint of mass production, costs, and availability as well as performance, the base material layer 41 is constituted by a resin having PET as a main component, as being a preferable configuration.

Figure 7:
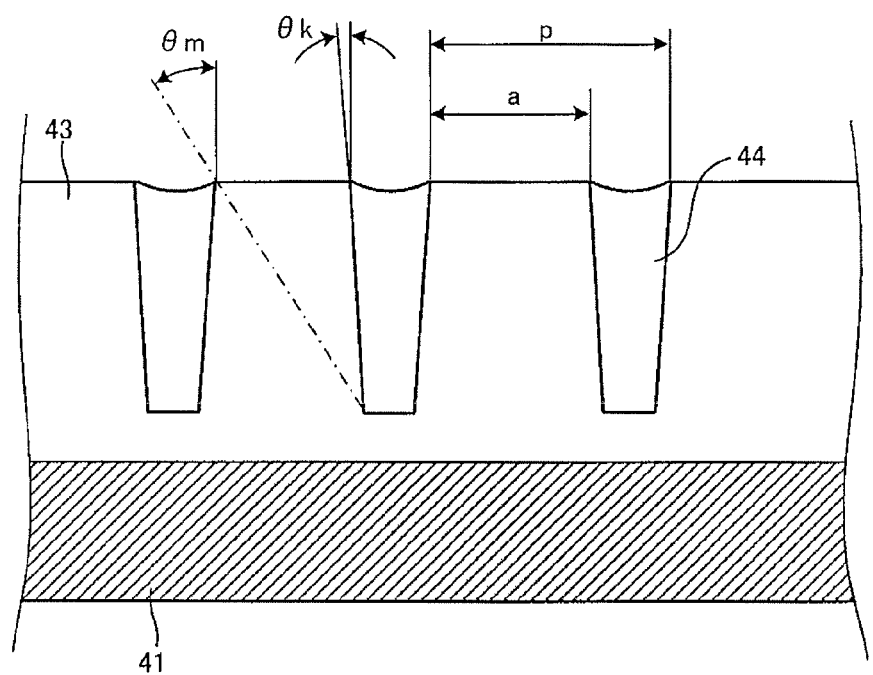
FIG. 7 is a partially enlarged view of FIG. 6.

The enlarging layer 42 is a layer which functions to control the light path of an image light from the surface light source device 20 side and the liquid crystal panel 15 side, and to enlarge a viewing angle. The enlarging layer 42 is configured to extend in a back/front direction of the drawing sheet of FIG. 6, with a cross section shown in FIG. 6. In specific, it comprises a transmissive portion 43 being substantially trapezoidal and an in-between portion 44 formed between the two adjacent transmissive portions 43 and having a substransially trapezoidal cross shape, in the cross section shown in FIG. 6. FIG. 7 shows a further enlarged view of a part of the view enlarging member 40 in FIG. 6.

As can be understood with reference to FIG. 1, the direction in which the transmissive portions 43 and the in-between portions 44 are arranged in a row is the same as the above described direction in which the unit lenses 32a of the optical sheet 30 are arranged in a row. Accordingly, the direction in which the transmissive portions 43 and the in-between portions 44 extend having the above described cross section thereof is the same as the direction in which the unit lenses 32a extend; and is orthogonal to the direction in which the unit optical elements 23a of the light guide plate 21 extend, when seen from the front side.

The transmissive portion 43 is a part which mainly functions to transmit light; and is an element which has a substantially trapezoidal cross section with a longer lower base on the base material layer 41 side and a shorter upper base on the opposite side (the observer side) in the cross section shown in FIGS. 6 and 7. The transmissive portions 43 are arranged in a row along the sheet face of the base material layer 41 with predetermined intervals; and the in-between portions 44 having a substantially trapezoidal cross section are formed between the transmissive portions 43. Accordingly, the in-between portion 44 has a trapezoidal cross shape with a longer lower base on the side where the upper base of the transmissive portion 43 is positioned and a shorter upper base on the side where the lower base of the transmissive portion 43 is positioned; and a necessary material described below is filled therein to form the in-between portion 44.

The transmissive portion 43 is configured to have a refractive index of Nt. Such a transmissive portion 43 can be formed by curing a composition for constituting the transmissive portion. Details will be given later. The value of the refractive index Nt is not particularly restricted; however, in view of the availability of the material to employ, it is preferably 1.49 to 1.56.

The in-between portion 44 is configured to have a refractive index of Nr. The refractive index Nr is smaller than the refractive index Nt of the transmissive portion 43. In this way, by making the refractive index of the in-between portion 44 smaller than the refractive index of the transmissive portion 43, it is possible to properly reflect, at the interface between the transmissive portion 43 and the in-between portion 44, the image light that has entered the transmissive portion 43 under the predetermined conditions. The value of the refractive index Nr is not particularly restricted; however, in view of the availability of the material to employ, it is preferably 1.49 to 1.56.

The difference between the refractive index Nt of the transmissive portion 43 and the refractive index Nr of the in-between portion 44 is not particularly restricted; however, it is preferably larger than 0 and 0.15 or less. With an increased refractive index, more amount of image light can be reflected to enlarge a view.

FIG. 7 shows a partially enlarged view of FIG. 6. The enlarging layer 42 is produced having the following shape for example.

The inclination angle ($\theta k$ in FIG. 7) of the oblique line between the transmissive portion and the in-between portion is preferably 5° to 15° with respect to the normal to the sheet face. If $\theta k$ is too small, the effect of enlarging a viewing angle decreases, degrading the function of the enlarging layer. On the other hand, if $\theta k$ is too large, the front brightness becomes insufficient and loss of light increases.

The pitch ("p" in FIG. 7) at which the transmissive portions 43 and the in-between portions 44 are aligned needs to be adequately adjusted by the pitch of the pixel in the liquid crystal panel, and it is approximately 50 μm.

The opening ratio (a/p), which is the ratio between the width of the transmissive portion on the light output side shown by "a" in FIG. 7 and the pitch p, also needs to be adequately adjusted by the pitch of the pixel in the liquid crystal panel. However, considering the balance between them in order to enlarge a viewing angle properly while maintaining the front brightness, the opening ratio is preferably about 50%.

The angle shown by "$\theta m$" in FIG. 7 (the angle that a line joining a light output side angle part of one in-between portion and a light input side angle part of another in-between portion makes with the normal to the sheet) is preferably 25° to 35°. If $\theta m$ is too small, the viewing angle becomes too narrow, degrading the function of the enlarging layer. On the other hand, if $\theta m$ is too large, the front brightness becomes insufficient and loss of light increases.

The view enlarging member 40 described above is produced in the following manner. First, the transmissive portion 43 is formed on the base material layer 41. That is, a base material sheet to become the base material layer 41 is inserted in between a die roll having on its surface a shape that can transfer the shape of the transmissive portion 43, and a nip roll disposed in a manner facing the die roll. At this time, the die roll and the nip roll are rotated while a composition for constituting the transmissive portion is supplied in between the base material sheet and the die roll. Thereby, the composition for constituting the transmissive portion is filled in a groove (a reversed shape of the transmissive portion) formed on the surface of the die roll, which groove corresponds to the transmissive portion, and accordingly the composition becomes the surface shape of the die roll.

Herein, as for the composition for constituting the transmissive portion, a light curable resin composition in which a reactive diluent monomer (M1) and a photopolymerization initiator (S1) are added to a light curable prepolymer (P1) is for example preferably used.

Examples of the light curable prepolymer (P1) include: epoxy acrylate-based, urethane acrylate-based, polyether acrylate-based, polyester acrylate-based, polythiol-based or other types of prepolymers.

Examples of the reactive diluent monomer (M1) include: vinylpyrrolidone, 2-ethylhexyl acrylate, β-hydroxy acrylate, and tetrahydrofurfuryl acrylate.

Examples of the photopolymerization initiator (S1) include: hydroxybenzoyl compounds (such as 2-hydroxy-2-methyl-1-phenylpropane-1-one, 1-hydroxycyclohexyl phenyl ketone, and benzoin alkyl ether); benzoyl formate compounds (such as methyl benzoyl formate); thioxanthone compounds (such as isopropyl thioxanthone); benzophenones (such as benzophenone); phosphoester compounds (such as 1,3,5-trimethylbenzoyl diphenylphosphine oxide, bis(2,4,6-trimethylbenzoyl)phenylphosphine oxide); and benzyl dimethyl ketal. The photopolymerization initiator may be adequately selected from these in view of the irradiation apparatus for curing the light curable resin composition and of the curing property of the light curable resin composition. Preferred in view of color protection of the transmissive portion are: 2-hydroxy-2-methyl-1-phenylpropane-1-one, 1-hydroxycyclohexyl phenyl ketone, and bis(2,4,6-trimethyl benzoyl) phenylphosphine oxide.

The amount of photopolymerization initiator (S1) to be contained in the light curable resin composition is preferably 0.5 mass % or more and 5.0 mass % or less, based on the total amount (100 mass %) of the composition, in view of the curing property and the cost of the light curable resin composition. In general, the photopolymerization initiator is at least partially soluble (for example, at a treatment temperature of the resin), and is substantially colorless after being polymerized. The photopolymerization initiator may be colored (for example, in yellow) on the condition that it becomes substantially colorless when the composition is cured to form the transmissive portion.

As to the light curable prepolymer (P1), reactive diluent monomer (M1), and photopolymerization initiator (S1) respectively, one kind thereof may be used, or two or more kinds thereof may be used in combination.

Further, various additives such as a silicone-based additive, rheology control agent, antifoaming agent, mold release agent, antistatic agent, and ultraviolet absorber can be added to the composition for constituting the transmissive portion, as necessary in order to improve the quality of the applying film, application properties and mold releasability from the die roll.

The composition for constituting the transmissive portion sandwiched between the die roll and the base material sheet and filled therein is irradiated with a light for curing, from the base material sheet side by a light irradiation apparatus. Thereby, the resin can be cured and the shape thereof can be fixed. Then, the base material layer 41 and the transmissive portion 43 molded are released from the die roll by a mold release roll.

Next, the in-between portion 44 is formed. In order to form the in-between portion 44, first, a composition for constituting the in-between portion is filled in a groove between the above formed transmissive portions 43. Thereafter, the excessive amount of composition is scraped off by a doctor blade or the like. Then, the remaining composition is irradiated with ultraviolet light from the transmissive portion 43 side to be cured thereby; and as a result, the in-between portion 44 can be formed.

A material to be used as the composition for constituting the in-between portion is not particularly restricted; however, a light curable resin composition in which a reactive diluent monomer (M2) and a photopolymerization initiator (S2) are added to a light curable prepolymer (P2) is for example preferably used.

Examples of the light curable prepolymer (P2) include: urethane (meth)acrylate, polyester (meth)acrylate, epoxy (meth)acrylate, and butadiene (meth)acrylate.

Examples of the reactive diluent monomer (M2) as a monofunctional monomer include: vinyl monomers such as N-vinylpyrrolidone, N-vinylcaprolactone, vinylimidazole, vinylpyridine, and stylene; monomers of (meth)acrylic acid ester such as lauryl (meth)acrylate, stearyl (meth)acrylate, butoxyethyl (meth)acrylate, ethoxy diethylene glycol (meth)acrylate, methoxy triethylene glycol (meth)acrylate, methoxy polyethylene glycol (meth)acrylate, methoxy dipropylene glycol (meth)acrylate, para-cumyl phenoxyethyl (meth)acrylate, nonylphenoxy polyethylene glycol (meth)acrylate, tetrahydrofurfuryl (meth)acrylate, isobornyl (meth)acrylate, cyclohexyl (meth)acrylate, benzyl methacrylate, N,N-dimethyl (meth)acrylamide, N,N-dimethylaminopropyl (meth)acrylate, and acryloylmorpholine; and the (meth)acrylamide derivatives.

In addition, examples of the reactive diluent monomer (M2) as a multifunctional monomer include: ethylene glycol di(meth)acrylate, diethylene glycol di(meth)acrylate, triethylene glycol di(meth)acrylate, polyethylene glycol di(meth)acrylate, tripropylene glycol di(meth)acrylate, polytetramethylene glycol di(meth)acrylate, 1,4-butanediol di(meth)acrylate, 1,6-hexanediol di(meth)acrylate, 1,9-nonanediol di(meth)acrylate, 3-methyl-1,5-pentanediol di(meth)acrylate, neopentyl glycol di(meth)acrylate, dimethyloltricyclodecane di(meth)acrylate, hydroxy pivalic acid neopentyl glycol di(meth)acrylate, bisphenol-A polypropoxydiol di(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, glyceryl tri(meth)acrylate, propoxylated glyceryl tri(meth)acrylate, tris(2-hydroxyethyl)isocyanurate triacrylate, pentaerythritol tetra(meth)acrylate, ditrimethylolpropane tetra(meth)acrylate, dipentaerythritol penta(meth)acrylate, and dipentaerythritolhexa(meth)acrylate.

Examples of the photopolymerization initiator (S2) include: 1-hydroxycyclohexyl phenyl ketone, 2-hydroxy-2-methyl-1-phenylpropane-1-one, 2,2-dimethoxy-1,2-diphenylethane-1-one, 2,4,6-trimethylbenzoyl diphenylphosphine oxide, and bis(2,4,6-trimethylbenzoyl)phenylphosphine oxide. The photopolymerization initiator may be adequately selected from these in view of the irradiation apparatus for curing the light curable resin composition and of the curing property of the light curable resin composition.

The amount of photopolymerization initiator (S2) to be contained in the light curable resin composition is preferably 0.5 mass % or more and 10.0 mass % or less, based on the total amount (100 mass %) of the light curable resin composition, in view of the curing property and the cost of the light curable resin composition.

As to the light curable prepolymer (P2), reactive diluent monomer (M2), and photopolymerization initiator (S2) respectively, one kind thereof may be used, or two or more kinds thereof may be used in combination.

In specific, these are used in an adequately mixed form, taking into account the refractive index, viscosity, effect on the property of the enlarging layer 42 etc. of the photopolymerizable component (specifically, the light curable prepolymer (P2) and the reactive diluent monomer (M2)) made of urethane acrylate, epoxy acrylate, tripropylene glycol diacrylate, and methoxy triethylene glycol acrylate.

Further, additives such as silicone, an antifoaming agent, a leveling agent, and a solvent may be added to the composition for constituting the in-between portion as necessary.

The display device 10 of the present embodiment is provided with the view enlarging member 40 as above.

Herein, the in-between portion 44 of the view enlarging member 40 may have a function to absorb light in addition to the above described function to reflect light at the interface. By this function, stray light or external light that have entered the inside of the in-between portion without being reflected can be absorbed, and the contrast can also be enhanced.

In order to enable the in-between portion to have the light absorbing property, light absorbing particles may be dispersed in the in-between portion; or the entire in-between portion may be colored by a pigment or a dye.

In a case of using the light absorbing particles, colored particles having a light absorbing property such as carbon black are preferably used as the light absorbing particles. However, the light absorbing particle is not limited thereto. Colored particles which selectively absorb light with a certain wavelength in accordance with the properties of the image light may be employed. Specific examples include: carbon black, graphite, a metal salt of black iron oxide or the like, organic particulates or glass beads colored by dye, pigment or the like. Especially, the colored organic particulates are preferably used in view of costs, quality, and availability. More specifically, acrylic cross-linked particulates containing carbon black and urethane cross-linked particulates containing carbon black are for example preferably used. Such colored particles are contained in the above composition for constituting the in-between portion in a range of 3 mass % or more and 30 mass % or less. The average particle size of the colored particles is preferably 1.0 μm or more and 20 μm or less.

The method of forming the in-between portion by dispersing the light absorbing particles therein is preferably carried out by dispersing the light absorbing particles in the above composition for constituting the in-between portion and curing the composition.

Figure 8A:
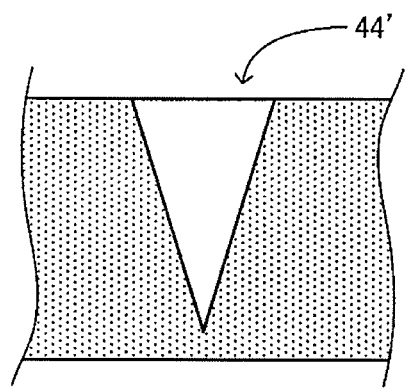
FIG. 8 is a view illustrating another example of an in-between portion.
Figure 8B:
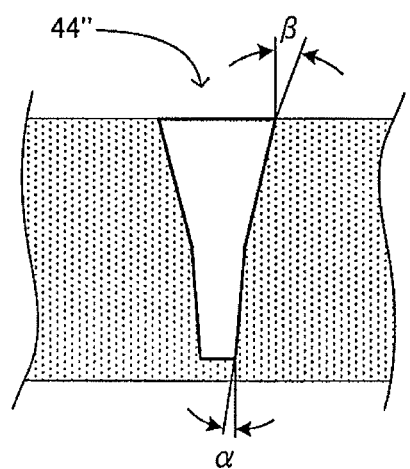
Figure 8C:
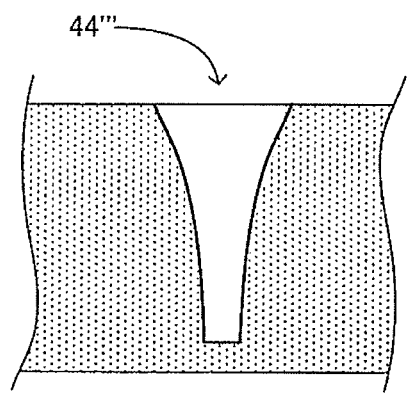

Further, in the present embodiment, the in-between portion is formed to have a trapezoidal cross section; however, the in-between portion is not limited to this configuration. It may have a different cross section. FIG. 8 shows the examples. In each view of FIG. 8, the lower side of the drawing sheet is the light input side; and the upper side thereof is the light output side. FIG. 8A shows an example of an in-between portion 44' having a substantially triangular cross section. FIG. 8B shows an example of an in-between portion 44", in which the inclination angle of the oblique line in the cross section differs between the light input side (a) and the light output side (β). In addition, FIG. 8C shows an example of an in-between portion 44''', in which the inclination angle of the oblique line continuously changes from the light input side toward the light output side, thus forming a curved line.

The in-between portion may have such cross-sectional shapes as these. However, the in-between portion needs to be inclined so that it serves as a view enlarging member to enlarge a view for the incident light.

Furthermore, in the present embodiment, the extending direction of the in-between portions and the transmissive portions is the same as the extending direction of the unit prisms of the optical sheet; however, the direction is not limited thereto. The in-between portions and the transmissive portions may be configured to extend in the same direction as the extending direction of the unit optical elements of the light guide plate. With this configuration, it is possible to diffuse light in a direction deviating by 90° from that of the present embodiment, and to enlarge a viewing angle thereof.

Next, the functions of the display device comprising the above configuration will be described while showing an example of the light path.

First, the light emitted from the light source 25 enters the light guide plate 21 through the light input face on the side face of the light guide plate 21, as shown in FIG. 2. FIG. 2 shows, as one example, light paths of the lights L21 and L22 incident upon the light guide plate 21 from the light source 25.

As shown in FIG. 2, the lights L21 and L22 that have entered the light guide plate 21 repeat total reflection on the face of the unit optical element portion 23 of the light guide plate 21 and the back face opposite thereto, due to the refractive index difference from the air; and move in the extending direction of the unit optical elements 23a.

Here, the light scattering agent 22b is dispersed in the main portion 22a in the base portion 22 of the light guide plate 21. Therefore in some cases, the moving directions of the lights L21 and L22 moving through the light guide plate 21 are changed irregularly by the light scattering agent 22b, and thus the lights L21 and L22 enter the unit optical element portion 23 and the face opposite thereto at an incident angle of less than a total reflection critical angle. In this case, the light may be emitted from the unit optical element portion 23 and the face opposite thereto of the light guide plate 21.

The lights L21 and L22 emitted from the unit optical element portion 23 move toward the optical sheet 30 disposed on the light output side of the light guide plate 21. On the other hand, the light emitted from the back face opposite to the unit optical element portion 23 is reflected by the reflection sheet 35 disposed on the rear side of the light guide plate 21; and re-enters the light guide plate 21 to move through the light guide plate 21.

The light moving through the light guide plate 21 and the light scattering agent 22b dispersed in the light guide plate 21 collide with each other in each zone along the light guiding direction of the light guide plate 21. Therefore, the light moving through the light guide plate 21 is emitted from the light output face little by little. This enables a uniform light amount distribution, along the light guiding direction, of the light emitted from the unit optical element portion 23 of the light guide plate 21.

In particular, the unit optical element portion 23 of the light guide plate 21 shown in the figure is constituted by a plurality of unit optical elements 23a; and the cross-sectional shape of each of the unit optical elements 23a is a triangle, or a shape in which a vertex angle of a triangle is chamfered. Namely, the unit optical element 23a is configured to have faces 23aa and 23ab inclined against the back face of the light guide plate 21 (see FIG. 4). Accordingly, the lights L21 and L22 emitted from the light guide plate 21 through the unit optical element 23a are refracted, as shown by the light L41 in FIG. 4, when emitted from the light guide plate 21. This refraction is a refraction that causes the light to come closer to the normal nd to the sheet face in the arrangement direction of the unit optical element 23a (a refraction whose angle with respect to the normal line nd becomes smaller). By this effect, as to the light component along the direction orthogonal to the light guiding direction, the unit optical element portion 23 can concentrate the moving direction of the transmitted light into the front direction side. Namely, the unit optical element portion 23 exerts a light condensing effect on the light component along the direction orthogonal to the light guiding direction.

As described above, when at least one of the below conditions A and B is satisfied, the unit optical element portion 23 highly effectively exerts the above light condensing effect on the light outputted from the light guide plate 21 (see FIG. 4).

Condition A: the angles other than the vertex angle in the triangular-shaped cross section, that is, angles θ1 and θ2 in the triangular-shaped cross section, which are the base angles positioned on the base portion 22, are 25° or more and 45° or less.

Condition B: the ratio (Ha/Wa) of the height Ha of the unit optical element 23a to the width Wa of the unit optical element 23a is 0.2 or more and 0.5 or less.

In this way, the emission angle of the light emitted from the light guide plate 21 is concentrated into a narrow angle range around the front direction, in the plane parallel to the arrangement direction of the unit optical elements 23a of the light guide plate 21.

The light emitted from the light guide plate 21 thereafter enters the optical sheet 30. The unit prism 32a of the optical sheet 30, like the unit optical element 23a of the light guide plate 21, exerts a light condensing effect on the transmitted light by refraction and total reflection on the light input face of the unit prism 32a. However, the light whose moving direction is changed in the optical sheet 30 is a component in the plane of the optical sheet 30 orthogonal to the arrangement direction of the unit prisms 32a; and differs from the light component converged in the light guide plate 21. That is, as shown by L51 in FIG. 5, the light that has entered the unit prism 32a is totally reflected at the interface between the unit prism 32a and the air based on the refractive index difference between them. At this time, the oblique line of the unit prism 32a is inclined at θ4/2 against the normal nd to the sheet face; therefore the reflected light at the interface has an angle closer to the normal nd than the incident light.

Namely, in the light guide plate 21, the moving direction of the light is concentrated into the narrow angle range around the front direction, in the plane parallel to the arrangement direction of the unit optical elements 23a of the light guide plate 21. On the other hand, in the optical sheet 30, the moving direction of the light is concentrated into the narrow angle range around the front direction, in the plane parallel to the arrangement direction of the unit prisms 32a of the optical sheet 30. Accordingly, it is possible, by the optical effects exerted in the optical sheet 30, to further enhance the front direction brightness without degrading the front direction brightness already enhanced in the light guide plate 21.

Herein, the lower polarizing plate 14 of the liquid crystal panel 15 selectively transmits only P wave, which is one of the polarization components, and absorbs S wave, which is the other polarization component. Therefore, based on the premise that the component along the arrangement direction of the unit optical elements 23a which crosses the arrangement direction of the unit prisms 32a is fully converged in the front direction by the light guide plate 21, the longitudinal direction of the unit prism 32a of the optical sheet 30 preferably crosses the transmission axis of the lower polarizing plate 14 of the liquid crystal panel 15 at an angle larger than 45° and smaller than 135°, when observed from the front side. In particular, the arrangement direction of the unit prisms 32a is preferably parallel to the transmission axis of the lower polarizing plate 14. With such a configuration, the light source use efficiency in the liquid crystal panel 15 can be further improved.

The cross-sectional shape of the unit prism 32a of the optical sheet 30 and the cross-sectional shape of the unit optical element 23a of the light guide plate 21 may be determined focusing strongly on converging the light component orthogonal to the light guiding direction. With the surface light source device 20 configured in this way, the light use efficiency can be improved dramatically.

Furthermore, the light path will be described. The light emitted from the surface light source device 20 as described above enters the lower polarizing plate 14 of the liquid crystal panel 15. Of the incident light, the lower polarizing plate 14 transmits one of the polarization components and absorbs the other polarization component. The light transmitted through the lower polarizing plate 14 is selectively transmitted through the upper polarizing plate 13 in accordance with the state of the application of the electric field on each pixel. In this manner, the liquid crystal panel 15 selectively transmits the light from the surface light source device 20 on a pixel to pixel basis, thereby enabling the observer of the liquid crystal display device 10 to observe the image.

As described above, the front direction brightness on the light output face of the surface light source device 20 is increased by the light condensing effects of the light guide plate 21 and of the optical sheet 30. That is, the display device 10 of the present embodiment has a function (a light condensing function) to shift the moving direction of the light into a narrow angle range around the front side, which is enabled by the unit optical element 23a of the light guide plate 21 and the unit prism 32a of the optical sheet 30. Thereby, the light source use efficiency can be improved and the front direction brightness can be highly effectively increased.

Figure 9:
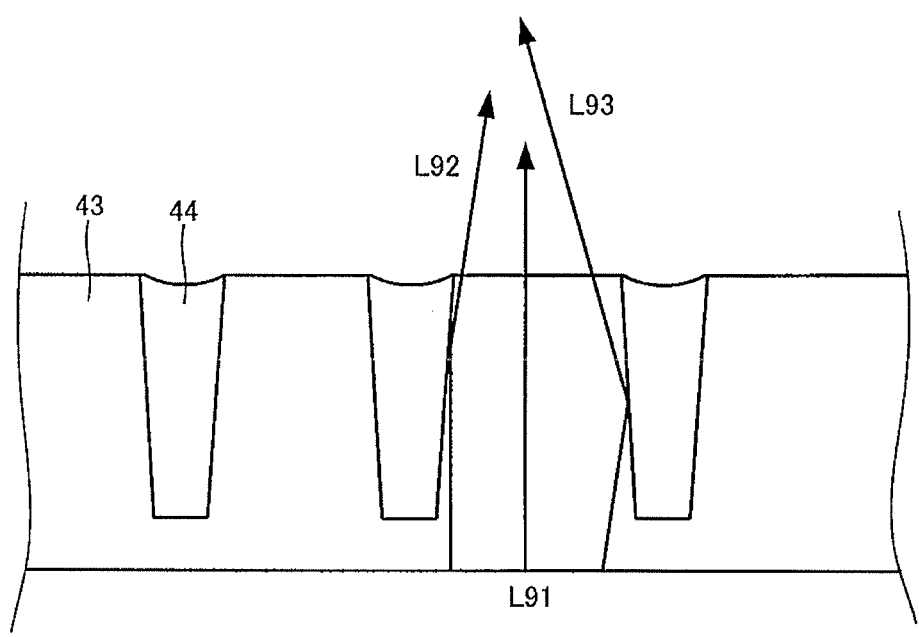
FIG. 9 is a view illustrating an example of a light path in the view enlarging member.

Furthermore, the light transmitted through the liquid crystal panel 15 enters the view enlarging member 40 in the form of an image light. FIG. 9 shows an example of the light path. The perpendicular light L91 that has entered the base material layer 41 from the liquid crystal panel 15 and has entered near the central part of the transmissive portion 43, directly passes straight through the inside of the transmissive portion 43 to reach the observer.

On the other hand, the perpendicular light L92 that has entered the base material layer 41 from the liquid crystal panel 15 and has entered near the end portion of the transmissive portion 43, is totally reflected on the oblique line at the interface between the transmissive portion 43 and the in-between portion 44 due to the refractive index difference between them; and is outputted to the observer side at a predetermined angle. At this time, the light L92 emitted to the observer side is shifted in a direction in which the viewing angle is enlarged, by the inclination angle at the interface between the transmissive portion 43 and the in-between portion 44.

In addition, the perpendicular light L93 that has entered the base material layer 41 from the liquid crystal panel 15 and has entered near the end portion of the transmissive portion 43 at a predetermined angle, is totally reflected on the oblique line at the interface between the transmissive portion 43 and the in-between portion 44 due to the refractive index difference between them; and is outputted to the observer side with a larger angle in a direction opposite from the entering direction.

Figure 10:
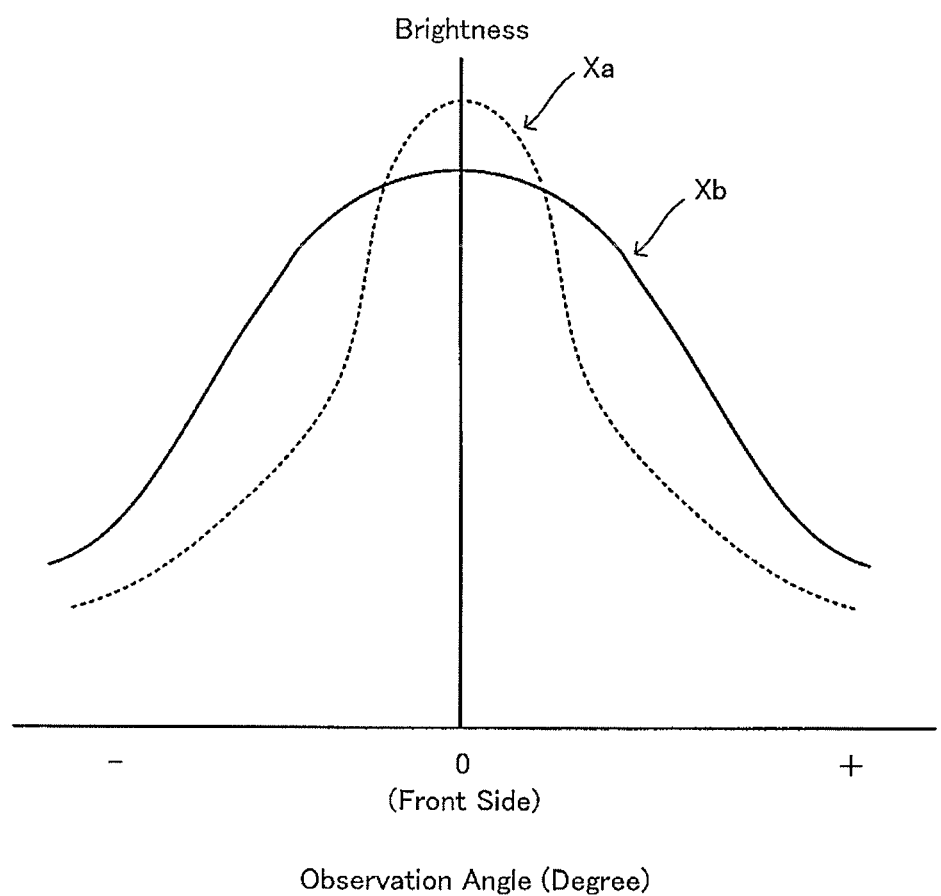
FIG. 10 is a view illustrating a relation between an observation angle and brightness.

Herein, since the image light has been converged by the surface light source device 20 as described above, directly emitting thus converged image light causes a relatively narrow viewing angle. In this respect, the view enlarging member 40 can enlarge the viewing angle. FIG. 10 shows a schematic view. FIG. 10 is a graph which shows the observation angle on the horizontal axis and the brightness on the vertical axis. The broken line shown by Xa in FIG. 10 shows a relation between the observation angle and the brightness at the point when the light is emitted from the liquid crystal panel 15. As understood from this graph, the use efficiency of the image light emitted from the liquid crystal panel 15 is enhanced and the brightness of the image light is high; however, the viewing angle is narrow. On the other hand, the line shown by Xb in FIG. 10 shows the relation between the observation angle and the brightness at the point when the light is emitted from the view enlarging member 40. As understood from this graph, the view is enlarged by the view enlarging member 40.

Further, since the light to be incident upon the view enlarging member 40 has been converged by the surface light source device 10, it is possible to inhibit the light from entering the in-between portion 44 of the view enlarging member 40. That is, it is possible to increase the amount of light totally reflected at the interface between the transmissive portion 43 and the in-between portion 44 and emitted.

If the extending direction of the transmissive portions 43 of the view enlarging member 40 is arranged to be vertical in the display device 10, a horizontal viewing angle can be enlarged. Further, if the extending direction of the transmissive portion 43 is arranged to be horizontal, a vertical viewing angle can be enlarged.

In addition, if two view enlarging members are used, one of which has the transmissive portions arranged horizontally and the other of which has the transmissive portions arranged vertically, it is possible to enlarge a viewing angle from top to bottom and from left to right.

In the display device 10 of the present embodiment, a liquid crystal panel of any type can be employed as mentioned above; however, especially as to the TN mode liquid crystal, although it has an advantage that it is efficient, has a simple structure, and is inexpensive, it inevitably has a narrow viewing angle. However, according to the present invention, it is possible to enlarge a view while maintaining high efficiency.

In the present embodiment, the view enlarging member 40 has been described as a preferable configuration of the device for enlarging a view. With this configuration, it is possible to enlarge a viewing angle with great directionality while maintaining high efficiency. However, the device for enlarging a view is not limited to this configuration. Other configurations may also be adopted. For example, those making use of light interference, refraction, or reflection may be adopted. In that case, as to the direction of enlarging a viewing angle, it is preferable to configure the device for enlarging a view such that it has directionality, for example a horizontal viewing angle and a vertical viewing angle. This enables enlargement of a viewing angle in a necessary direction, and also enables inhibition of degradation of the clearness of the image.

DESCRIPTION OF THE REFERENCE NUMERALS 10 display device
15 liquid crystal panel
20 surface light source device
21 light guide plate
23 unit optical element portion
25 light source
30 optical sheet
32 unit prism portion
40 view enlarging member
43 transmissive portion
44 in-between portion

The invention claimed is:

1. A display device which outputs light emitted from a light source to an observer side in a form of an image, the display device comprising:

a light guide plate having a light transmitting property, which has a light output face directed toward the observer side, a back face opposing to the light output face, and a side face positioned between the light output face and the back face;

a light source disposed on the side face of the light guide plate so as to be capable of emitting light thereto;

an optical sheet disposed on the observer side of the light guide plate;

a liquid crystal panel disposed on the observer side of the optical sheet; and a device for enlarging a view disposed on the observer side of the liquid crystal panel, wherein a plurality of protruding unit optical elements are arranged in a row on the light output face side of the light guide plate, along the sheet face;

the unit optical elements extend from the side face where the light source is disposed to the side face opposing thereto with a predetermined cross section, and are arranged in a row in a direction orthogonal to the extending direction thereof;

a plurality of protruding unit prisms are arranged in a row on the light guide plate side face of the optical sheet, along the sheet face;

the unit prisms extend in the arrangement direction of the unit optical elements, with a predetermined cross section, and are arranged in a row in a direction orthogonal to the extending direction of the unit prism;

the device for enlarging a view is a view enlarging member which is disposed on the observer side of the liquid crystal panel; and the view enlarging member comprises a light enlarging portion provided with: a plurality of transmissive portions having a substantially trapezoidal cross section with a shorter upper base on the observer side and a longer lower base on the liquid crystal panel side, having a light transmitting property, and arranged in a row along the sheet face; and in-between portions formed between the adjacent light transmissive portions and having a refractive index smaller than that of the transmissive portion, the light enlarging portion totally reflecting light between an interface of the transmissive portions and the in-between portions, and the transmissive portions extend in one direction while maintaining the substantially trapezoidal cross section.

2. The display device according to claim 1, wherein an extending direction of the view enlarging member is parallel to the extending direction of the unit optical elements or in the extending direction of the unit prisms.

3. The display device according to claim 1, wherein the in-between portion of the view enlarging member is configured to be capable of absorbing light.

4. The display device according to claim 1, wherein the transmissive portion of the view enlarging member extends in a perpendicular direction.

5. The display device according to claim 1, wherein a light scattering agent is dispersed in the light guide plate.

6. The display device according to claim 1, wherein the liquid crystal panel is a TN mode one.

* * * * *